(No Model.)
B. C. ANDERSON.
PLUMBER'S TRAP.
No. 473,993. Patented May 3, 1892.
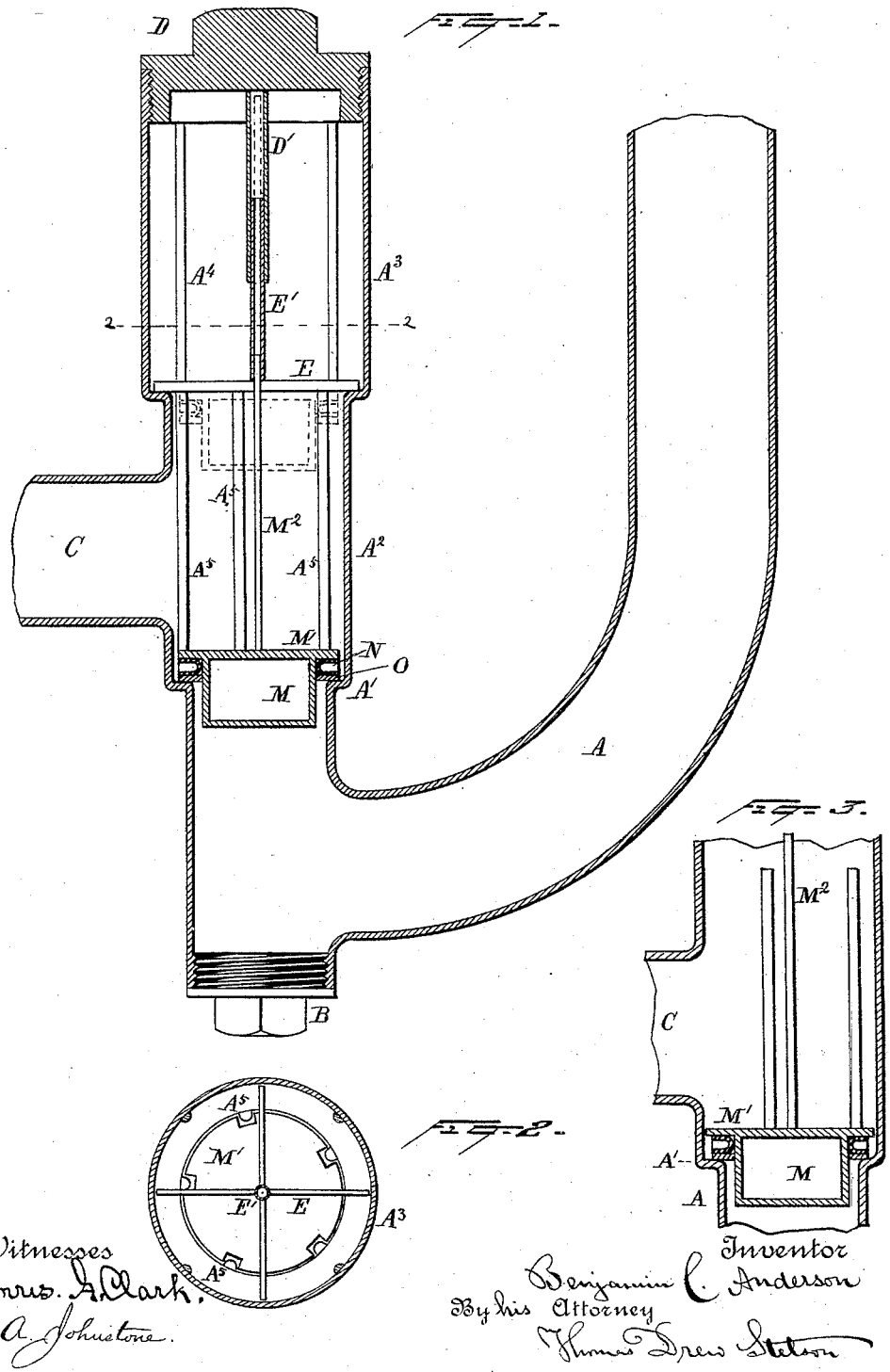

United States Patent Office.

BENJAMIN C. ANDERSON, OF BROOKLYN, NEW YORK.

PLUMBER'S TRAP.

SPECIFICATION forming part of Letters Patent No. 473,993, dated May 3, 1892.

Application filed January 18, 1892. Serial No. 418,464. (No model.)

*To all whom it may concern:*

Be it known that I, BENJAMIN C. ANDERSON, a citizen of the United States, residing in Brooklyn, in the county of Kings and State of New York, have invented a certain new and useful Improvement in Plumbers' Traps, of which the following is a specification.

There have been many attempts to apply a valve in combination with a trap to defend against sewer-gas. My improvement relates thereto and avoids difficulties heretofore experienced.

The accompanying drawings form a part of this specification and represent what I consider the best means of carrying out the invention.

Figure 1 is a central vertical section, and Fig. 2 a horizontal section on the line 2 2 in Fig. 1. Fig. 3 is a central vertical section of a portion showing a modification.

Similar letters of reference indicate corresponding parts in all the figures.

A is the ordinary pipe bringing down the water from a higher point, and having the ordinary bend and short ascending portion, with a screw-plug B in the bottom, which may be removed at intervals for cleaning, all as usual.

C is a portion of the pipe which leads the water away from the trap to the street-main. (Not shown.)

The interior of the pipe A below the junction of C is provided with a well-finished seat A'. Above this the pipe A is enlarged, as indicated by $A^2$, and at a point considerably above the junction of the pipe C it is enlarged still further, as indicated by $A^3$. A screw-plug D closes the extreme top and is provided with a short straight tube D', extending down in the center. This tube D' receives a smaller tube E', ascending from below, which latter is fixed on an open-work frame or spider E, which latter is of such size that it will descend through the enlarged portion $A^3$, but cannot enter the smaller portion $A^2$ of the pipe. The inner face of the largest portion $A^3$ is provided with four or other desired number of vertical ridges $A^4$, which I have in my experiments secured by soldering; but other means can be used. The arms of the spider E being received between these ribs prevent the spider from turning.

I employ a light valve of thin copper or other suitable material not liable to oxidation or corrosion, having a deep cylindrical chamber M, smaller than the pipe A, a flat horizontal disk M' at its top, larger than the pipe A, and a stem $M^2$, extending upward through the pipe E'. It is important that this valve be allowed to move easily. Around the cylindrical portion M and under the overhanging edge or flange produced by the disk M', I apply a washer N of thin soft vulcanized rubber, shaped as shown, so as to be very elastic, and under this I apply a leather washer O, the latter fitting with sufficient tightness on the cylindrical portion M to be retained when the valve is lifted out, but adapted to shift its position, if required, to adjust itself to its seat under the gentle pressure of the elastic washer above. This valve is free to rise and sink. The considerable volume of its cylindrical body M allows it to nearly float, so it will open with great ease. In practice it will rise into contact with the spider E whenever water is flowing through the pipe, and will descend slowly again and rest on the seat A' so soon as the flow of water stops. The conditions insure that there will be water above this valve to pack it. Its lightness, causing it to rise and remain out of the current while the water is flowing, allows any solid matter, bits of string, hair, or the like to move freely past, and greatly reduces the chance of its becoming clogged. The removal of the screw-plug D, with its tube D', allows the spider E and its smaller tube E' to be lifted out. The valve may be left undisturbed to determine its exact condition, and afterward it may be lifted out. When the plug B is removed, the trap may be easily inspected and cleaned.

A series of five or other number of internal vertical ribs $A^5$ extend from the valve-seat A' up to the seat for the spider E. The overhang or rim of the valve M' is notched to receive these ribs and be guided by them. These ribs $A^5$ are straight and smooth, so as to form efficient and practically frictionless guides for the valve, preventing the latter from either being displaced bodily or from revolving. The elastic face of the valve produced by the washer O and spring washer N can adapt itself to the seat or to any foreign matter which may rest on the seat within reasonable limits, and the valve being guided against revolving will close tightly upon a quite irregular seat.

Modifications may be made without departing from the principle or sacrificing the advantages of the invention. Instead of the enlargement $A^3$, the pipe may be continued of the diameter of the part $A^2$ quite to the top, the spider E being correspondingly reduced in diameter, and the seat for the spider being formed by the upper ends of the internal ridges $A^5$. In such case the upper series $A^4$ of the internal ridges should be omitted.

The notching of the soft washers N and O may be avoided by making the seat a little smaller and having the notches in the rim of the disk M′ alone. Fig. 3 shows such a construction.

I claim as my invention—

1. In a trap, the deep light valve M, with its metal disk M′ and stem $M^2$, in combination with the main pipe A, extended upward past the connected delivery-pipe C and having a valve-seat A′, and the bottom plug B and top plug D, removable spider E, and matched tubes D′ E′, all arranged for joint operation substantially as herein specified.

2. In a trap, the deep light valve M, provided with the elastic washer N and soft washer O, with its metal disk M′ notched in its periphery, and stem $M^2$, in combination with the main pipe A, extended upward past the connected delivery-pipe C and having a valve-seat A′ and internal vertical ribs or ridges $A^5$, and the bottom plug B and top plug D, removable spider E, and matched tubes D′ E′, all arranged for joint operation substantially as herein specified.

In testimony that I claim the invention above set forth I affix my signature in presence of two witnesses.

BENJAMIN C. ANDERSON.

Witnesses:
THOMAS DREW STETSON,
H. A. JOHNSTONE.